(12) United States Patent
Eyal et al.

(10) Patent No.: US 12,030,598 B2
(45) Date of Patent: *Jul. 9, 2024

(54) SYSTEM AND METHOD OF CONTROLLING MARINE VESSELS

(71) Applicant: AQUA MARINA TECHNOLOGIES LTD., Herzliya (IL)

(72) Inventors: Amir Eyal, Haruzi (IL); Ofer Sela, Haifa (IL); Yaron Shlomo Carmon, Even Yehuda (IL); Lawrence Natan, Kiriyat Ono (IL); Yehonatan Ofir, Atlit (IL)

(73) Assignee: AQUA MARINA YACHTS (1995) LTD., Herzliya (IL)

( * ) Notice: Subject to any disclaimer, the term of this patent is extended or adjusted under 35 U.S.C. 154(b) by 201 days.

This patent is subject to a terminal disclaimer.

(21) Appl. No.: 16/938,435

(22) Filed: Jul. 24, 2020

(65) Prior Publication Data

US 2021/0009239 A1 Jan. 14, 2021

Related U.S. Application Data

(63) Continuation of application No. 16/509,076, filed on Jul. 11, 2019, now Pat. No. 10,723,423.
(Continued)

(51) Int. Cl.
*B63B 49/00* (2006.01)
*B63H 25/04* (2006.01)
(Continued)

(52) U.S. Cl.
CPC ............. *B63B 49/00* (2013.01); *B63H 25/04* (2013.01); *B63H 25/42* (2013.01); *G01C 13/008* (2013.01);
(Continued)

(58) Field of Classification Search
CPC ......... B63B 49/00; B63B 43/18; B63H 25/42; B63H 25/04; B63H 2025/045; G05D 1/0206; G08G 3/02; G01C 13/008
(Continued)

(56) References Cited

U.S. PATENT DOCUMENTS 4,466,068 A    8/1984  Degre et al.
8,612,085 B2 * 12/2013  Flohr .................. G05D 1/0011
                                                       701/27
(Continued)

FOREIGN PATENT DOCUMENTS

CN      101256721 A    9/2008
GB      2474715 A    4/2011
(Continued)

OTHER PUBLICATIONS

International Search Report of PCT Application No. PCT/IL2019/050772 dated Oct. 24, 2019.
(Continued)

*Primary Examiner* — Maceeh Anwari
(74) *Attorney, Agent, or Firm* — The Roy Gross Law Firm, LLC; Roy Gross

(57) ABSTRACT

Aspects of the invention may be related to a computer system and a computerized method of controlling a marine vessel. Embodiments may include: receiving, by a controller, a position of the marine vessel from a positioning system; receiving, by the controller, geographical data, from at least one database, the geographical data may include at least a map of seabed depths; receiving, by the controller, a heading direction and speed of the marine vessel; calculating, by the controller, a safety zone ahead of the marine vessel based on the position, the heading direction and the speed of the marine vessel; identifying a location of a critical seabed depth inside the safety zone based on the received,
(Continued)

the geographical data; and changing, by the controller, a state of a propelling unit of the marine vessel when a critical seabed depth was identified inside the safety zone.

10 Claims, 5 Drawing Sheets

Related U.S. Application Data

(60) Provisional application No. 62/698,159, filed on Jul. 15, 2018.

(51) Int. Cl.
*B63H 25/42* (2006.01)
*G01C 13/00* (2006.01)
*G05D 1/00* (2006.01)
*G05D 1/02* (2020.01)
*G08G 3/02* (2006.01)

(52) U.S. Cl.
CPC ............. *G05D 1/0206* (2013.01); *G08G 3/02* (2013.01); *B63H 2025/045* (2013.01)

(58) Field of Classification Search
USPC .......................................................... 701/21
See application file for complete search history.

(56) References Cited

U.S. PATENT DOCUMENTS

| | | | | |
|---|---|---|---|---|
| 9,223,310 | B2 * | 12/2015 | Ballou | .................... B63B 35/00 |
| 9,689,688 | B2 * | 6/2017 | Sasao | ................... G01C 21/203 |
| 2017/0365175 | A1 * | 12/2017 | Harnett | ................. B63H 20/14 |

FOREIGN PATENT DOCUMENTS

| | | | |
|---|---|---|---|
| JP | S543515 | Y2 | 2/1979 |
| JP | H0522354 | A | 1/1993 |
| JP | H05223584 | A * | 8/1993 |
| JP | H07165178 | A | 6/1995 |
| JP | 2000182199 | A | 6/2000 |
| JP | 2002245599 | A | 8/2002 |
| JP | 2016099198 | A | 5/2016 |

OTHER PUBLICATIONS

European Search Report of Application No. 19838904.1 mailed on Mar. 31, 2022, 7pp.
Japanese Office Action for Japanese Patent Application No. JP2021525405A, dated Jul. 5, 2023, 6pp.

* cited by examiner

SYSTEM AND METHOD OF CONTROLLING MARINE VESSELS

CROSS REFERENCE TO RELATED APPLICATIONS

This application is a continuation application of U.S. application Ser. No. 16/509,076, now U.S. Pat. No. 10,723,423, filed Jul. 11, 2019, which claims the benefit of U.S. Provisional Patent Application No. 62/698,159, filed on Jul. 15, 2018 and entitled SYSTEM AND METHOD OF CONTROLLING MARINE VESSELS, which is incorporated in its entirety by reference.

FIELD OF THE INVENTION

This application relates to the field of navigating and controlling a marine vessel, and more particularly the application relates to systems and methods for preventing marine vessels grounding.

BACKGROUND OF THE INVENTION

About twenty percent of marine vessels accidents are caused by a vessel running aground when it is unintentionally grounded on reefs, shores, shallow waters, and other static hazards. It is so frequent, second only to ship-on-ship collision. Running aground might lead to human injuries and casualties, structural damage, cargo falling, total loss of the marine vessel, insurance financial claims and the like. Even with modern navigation systems, new technologies, and improved safety measures, maritime accidents still occur, and ship groundings are one of the more frequent types of accidents.

Human errors are the main cause of running aground accidents. Even professional navigators suffer from human errors caused by lack of communication, lookout errors, analysis errors, fatigue, and the like.

Prior to the global positioning systems (GPS) and electronic maps, navigation was done solely based on nautical charts, which were plotted/drafted on paper. Digitizing of nautical charts led to the development of Electronic Nautical Charts (ENC). There are two main types of ENCs, the raster chart and the vector chart. While the first is merely a scanned version of the earlier paper navigational charts discussed, the second is more data oriented. Though hidden, the data at a particular position is instantly given when sought (with a click of the mouse or pressing a button). The vector chart ENC is provided by navigational software, such as, Electronic Chart Display Information System (ECDIS). The chart plotter ENC displays on the chart: the position, heading direction and speed of the ship, and may display additional information from a radar, automatic information systems (AIS) or other sensors. In recent years, some applications added "smart dynamic alerts" in which the application is calculating the risk of collision based on the chart data and the ship movement vector and alerts accordingly.

SUMMARY OF THE INVENTION

Some aspects of the invention may be related to a computer system and a computerized method of controlling a marine vessel. A memory included in the system may include a code comprising instructions to be executed by a controller and may control the marine vessel engine. Some embodiments may include: receiving, by a controller, a position of the marine vessel from a positioning system; receiving, by the controller, geographical data, from at least one database, the geographical data includes at least a map of seabed depths; receiving, by the controller, a heading direction and speed of the marine vessel; determining, by the controller, a safety zone ahead of the marine vessel based on the position, the heading direction and the speed of the marine vessel; identifying a location of a critical seabed depth inside the safety zone based on the received geographical data; and changing, by the controller, a state of a propelling unit of the marine vessel when a critical seabed depth was identified inside the safety zone.

In some embodiments, changing the state of the propelling unit of the marine vessel may include: at least one of: reducing the speed of the marine vessel, disengaging the engine of the marine vessel from the propelling unit, activating dynamic positioning system (DPS), maneuvering the marine vessel towards a wind direction and changing the course of the marine vessel. In some embodiments, determining the safety zone may include dynamically updating margin distances of the safety zone during the marine vessel cruise. In some embodiments, identifying a location of a critical seabed depth inside the safety zone may include calculating an effective seabed depth based on the vessel's draft and a predetermined safety depth.

In some embodiments, determining, by the controller, the safety zone a head the marine vessel may include calculating an expected time for running aground of the marine vessel. In some embodiments, calculating the expected running aground time may include calculating the required vessel's deceleration. In some embodiments, calculating the required vessel's deceleration may include calculating the vessel's deceleration from a current cruising speed to an engaged speed, wherein the engaged speed is the speed in which the engine can engage with or disengage from the purpling unit. In some embodiments, calculating the required vessel's deceleration may further include calculating the vessel's deceleration from the engaged speed until a zero speed in the cruising direction. In some embodiments, calculating the vessel's deceleration is from the cruising speed until a zero speed in the cruising direction.

In some embodiments, an alert may be added to the calculated expected time of running aground.

In some embodiments, real time measurement of an actual seabed depth at the position of the marine vessel may be received from a depth sensor associated with the marine vessel; the actual seabed depth may be compared with a seabed depth at the position of the marine vessel from the received geographical data; and the seabed depths included in the received geographical data may be corrected based on the comparison.

In some embodiments, marine vessel properties may be received; and the safety zone may be calculated based also on the marine vessel properties. In some embodiments, the marine vessel properties may include at least one of: the type of the marine vessel, the weight of the cargo carried by the marine vessel, the distribution of the cargo on the marine vessel and the dimensions of the marine vessel.

In some embodiments, meteorological data may be received in an area at which the marine vessel is sailing; and the safety zone may also be calculated based on the meteorological data. In some embodiments, the meteorological data may include at least one of: wind velocity, wind direction, high and low tides, and current. In some embodiments, the meteorological data is received from at least one of: a database and at least one sensor associated with the marine vessel.

Other aspects of the invention may be related to a computer system and a computerized method of controlling a marine vessel. A memory included in the system may include a code comprising instructions to be executed by a controller and may control the marine vessel engine. Some embodiments may include: receiving, by a controller, a position of the marine vessel from a positioning system; receiving, by the controller, geographical data, from at least one database, the geographical data includes at least a map of seabed depths; receiving, by the controller, a heading direction and speed of the marine vessel; determining, by the controller, a safety zone ahead of the marine vessel based on the position, the heading direction and the speed of the marine vessel; identifying a location of a critical seabed depth inside the safety zone based on the received geographical data; and sending an alert to a user device, by the controller, when a critical seabed depth was identified inside the safety zone.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
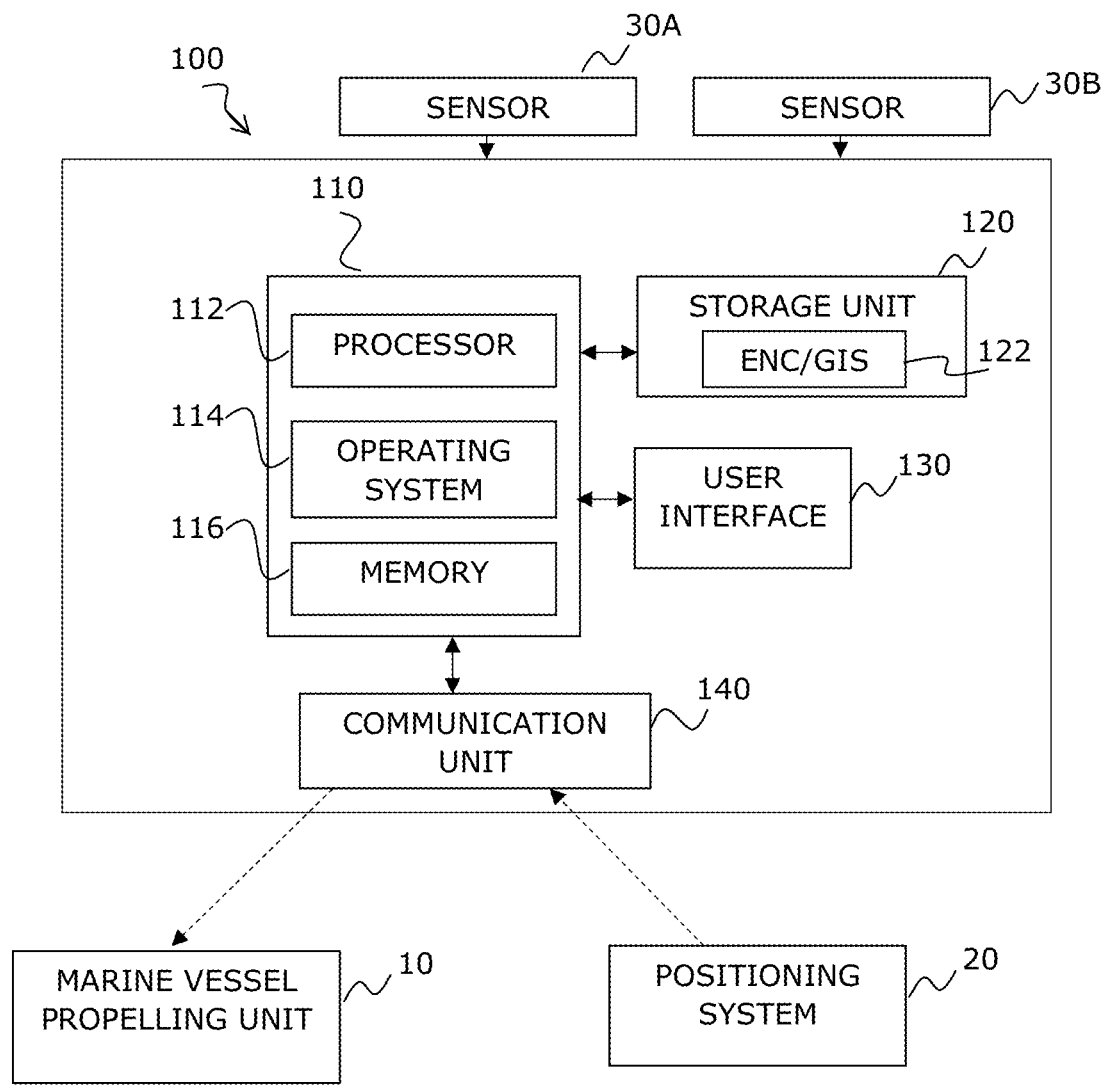
FIG. 1 is an illustration of a system for controlling a marine vessel according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1 which is an illustration of a system for controlling a marine vessel according to some embodiments of the invention. In some embodiments, a system 100 may be included in marine vessel 10 illustrated in FIG. 2 or may be an independent system. The marine vessel may be any type of marine vessel using any propulsion method, for example, cargo ships, military vessels, yachts, small boats, submarines etc. System 100 may include a computer processing device 110, at least one storage unit 120, a user interface 130 and a communication unit 140. Processing unit 110 may include a processor or controller 112 that may be, for example, a central processing unit (CPU), a chip or any suitable computing or computational device, an operating system 114 and a memory 116. System 100 may be included in a desktop computer, laptop computer, a tablet, a mainframe computer or the like. Processor (e.g., controller) 112 may be configured to carry out methods according to some embodiments of the present invention by, for example, executing instructions stored in a memory such as memory 116.

Operating system 114 may be or may include any code segment designed and/or configured to perform tasks involving coordination, scheduling, arbitration, supervising, controlling or otherwise managing operation of processing device 110, for example, scheduling execution of programs. Operating system 114 may be a commercial operating system. Memory 116 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 116 may be or may include a plurality of, possibly different memory units.

In some embodiments, computer processing device 110 may be hosted in a cloud-based processing service, such that both professor 112 and memory 116 may be located on the cloud, and system 100 may communicate with the cloud via the internet, using for example, communication unit 140.

Memory 116 may store any executable code, e.g., an application, a program, a process, task or script. The executable code may include instructions for controlling a marine vessel or any other codes or instruction for executing methods according to embodiments of the present invention. The executable code may be executed by processor/controller 112 possibly under control of operating system 114.

At least one storage unit 120 may be or may include any storage unit either internal or external to computer processing device 110 that provides data to computer processing device 110. In some embodiments, storage unit 120 may include geographical data module 122 (e.g., ENC/GIS module). Geographical data module may include ENC data and/or geographic information system (GIS) data or any other source that may provide at least a map of seabed depths in proximity to the marine vessel. In some embodiments, storage unit 120 may further include marine vessel data (e.g., properties), meteorological data in an area at which the marine vessel sails and the like. In some embodiments, the meteorological data may include high and low tides sea level and the like.

At least one storage 120, may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 120 and may be loaded from storage 120 into memory 116 where it may be processed by processor 112.

User interface 130 may be or may include any input or output device that may allow a user to upload or receive information form system 100. For example, user interface 130 may include a screen, a touchscreen, a mouse, a keyboard, loud speakers and the like. In some embodiments, system 100 may be connected and displayed in a multi-function display.

In some embodiments, communication unit 140 may include any form of wired or wireless communication form, such as LAN, W-LAN, Wi-Fi, Bluetooth, satellite communication means and the like. For example, communication unit 140 may allow system 100 to receive information from external databased over the Internet, for example, updated meteorological data. In another example, communication unit 140 may allow system 100 to receive information from one or more sensors 30A-30B and a positioning system 20 associated with the marine vessel.

One or more sensors 30A-30B may include a sonar, depth sensor, wind sensor (e.g., a wind probe), a motion detector, a camera, a radar and the like.

In some embodiments, positioning system 20 may include any Global Positioning System (GPS) that may provide the vessel's coordinates, the speed over ground (SOG) and the course over ground (COG) of the marine vessel. Positioning system 20 may be included in system 100 or may be external and communicating with system 100. Positioning system 20 may include a GPS antenna and may be configured to communicate with a GPS satellite. Positioning system 20 may be configured to provide both statistic data such as vessel's current coordinates but also dynamic data related to the speed and course direction such as the SOG and COG of the marine vessel. These three inputs, location, speed and direction, may allow computer processing device 110 to estimate the time to running aground based also on the location of the coast/ground received for example, from ENC/GIS module 122. In some embodiments, computer processing device 110 may communicate and control the marine vessel's 10 propelling unit, either directly or via communication unit 140. Computer processing device 110 may change the state of the propelling unit, for example, it may stop the propulsion by stopping the engine or change the course of the marine vessel. Computer processing device 110 may use at least the data received from ENC/GIS module 122 and positioning system 20 to estimate the time to running aground, as discussed in details with respect to the method of FIG. 3. When the estimated time to running aground, from the current location at the current speed and direction, is less than a predetermined threshold value, computer processing device 110 may force the marine vessel to stop, by for example, disconnecting the engine from the propelling unit. In some embodiments, computer processing device 110 may order the propelling unit to change course, for example, when the marine vessel is a sailing-boat the controller may cause the boat to turn against the wind in order to slow down the sailing-boat.

Figure 2A:
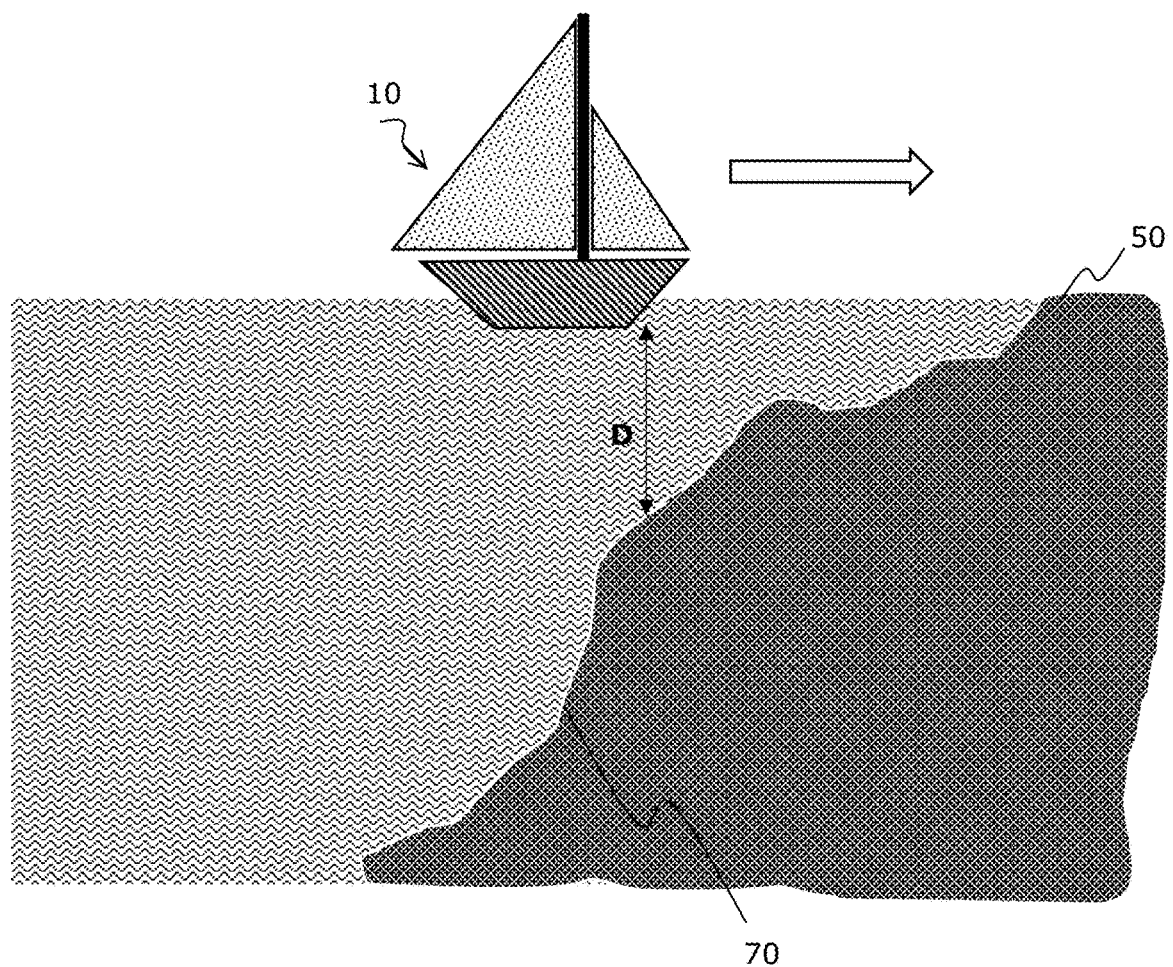
FIGS. 2A-2C are illustrations of a marine vessel in the sea according to some embodiments of the invention.
Figure 2B:
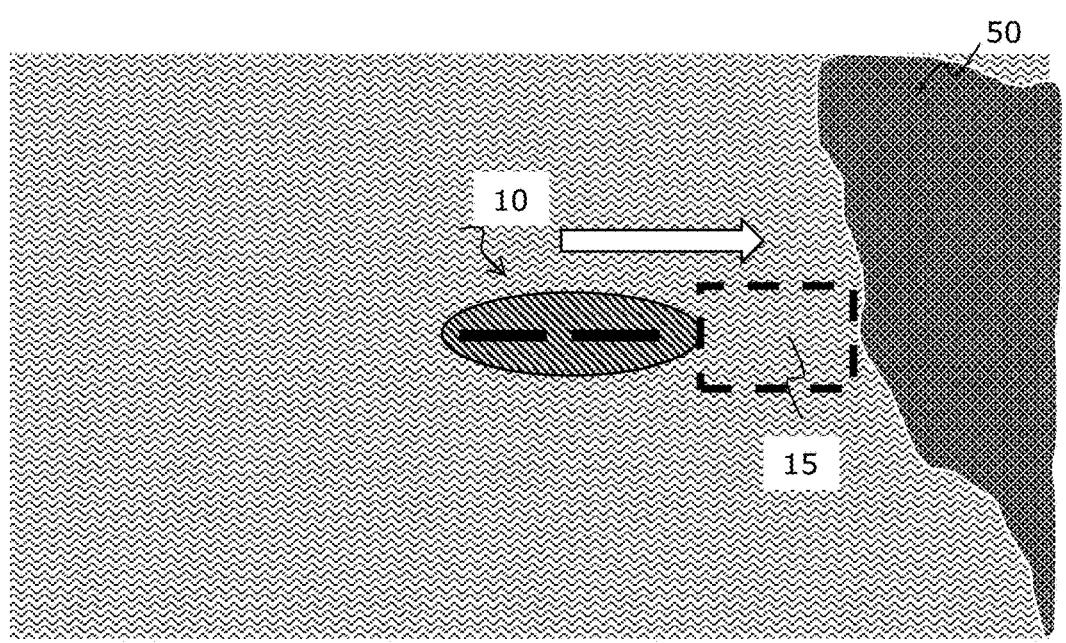
Figure 2C:
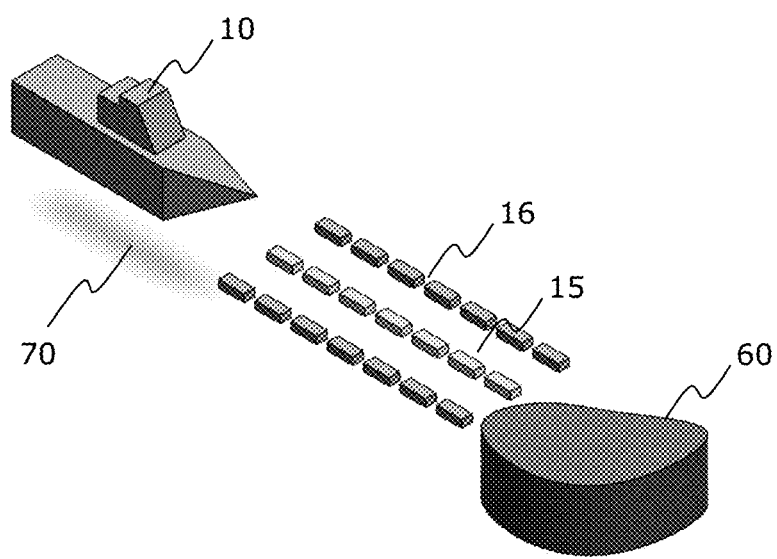

Referring now to FIGS. 2A-2C, which are illustrations of side view and top view of a marine vessel 10 in a position from coastline 50 or an obstacle 60 on seabed 70. The seabed depth is denoted as D which can be different from the actual distance of marine vessel 10 bottom to seabed 70. A safety zone 15 ahead of marine vessel 10 that, if kept, may prevent marine vessel 10 from running aground is illustrated as a dashed rectangle in FIGS. 2B and 2C. Safety zone 15 may be determined by computer processing device 110 and may depend on several parameters, for example, the type of marine vessel 10, the speed and direction of marine vessel 10, the water drift and the wind conditions, as will be discussed with respect to the method of FIG. 3. In some embodiments, safety zone 15 may include margins 16 from each side in the heading direction, as illustrated in FIG. 2C. In some embodiments, margins 16 may be set according to a predetermined setup of the marine vessel and may be dependent from the size and type of the marine vessel. For example, a yacht having the following dimensions: a length of 45 fit and a 6 meter beam may set with 4 meter marines from each side of the yacht. In some embodiments, the front margin of the safety zone may be calculated based on the expected time of running aground that may be dynamically be updated during the marine vessel cruise.

In some embodiments, the seabed depth received from the GIS and/or ENC maps may include the lowest possible depth measured in a particular point in the sea. The actual distance of marine vessel 10 to bottom to the seabed may, therefore, be different and may be affected by several parameters, for example, marine vessel 10 draft (e.g., that may be affected by the size, type and weight (e.g., loaded/unloaded) of marine vessel 10), the current and the like. When marine vessel 10 is approaching, for example, a coast 50 or obstacle 60 in a cruising course marked by the arrow, several parameters must be taken into account in order to prevent the running aground of marine vessel 10 with coast line 50 or obstacle 60, as disclosed and discussed with respect to the method of FIG. 3.

Figure 3:
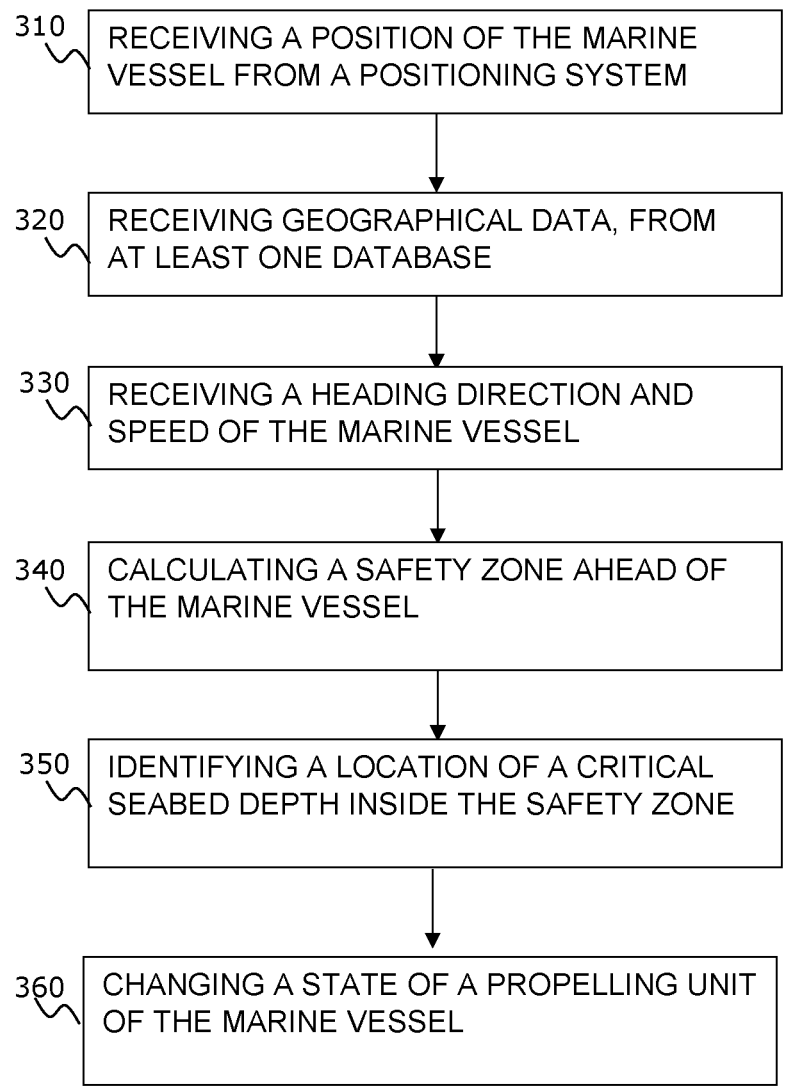
FIG. 3 shows a flowchart of a method of controlling a marine vessel according to some embodiments of the invention.

Referring now to FIG. 3 which is a flowchart of a method of controlling a marine vessel according to some embodiments of the invention. When executed, the method of FIG. 3 may prevent the running aground of a marine vessel with the seabed, with reefs and the like. The embodiments of FIG. 3 may be executed by computer processing device 110 of system 100 or by any other suitable controller. In step 310, a position of the marine vessel (e.g., marine vessel 10) may be received from a positioning system (e.g., positioning system 20). For example, the position coordinates of marine vessel 10 may be received from the GPS of marine vessel 10.

In step 320, geographical data may be received from at least one database. In some embodiments, the geographical data may include at least a map of seabed depths D in proximity to the marine vessel. For example, the geographical data may include ENC map and/or GIS data, received from geographical data module 122, included in storage unit 120 or from an external database over the internet. In some embodiments, the geographical data stored in module 122 may periodically be updated.

In step 330, the expected heading and speed of the marine vessel may be received by computing device 110 from a sensor or a navigational software. For example, the expected SOG and COG may be received or calculated based on information received from positioning system 20. In yet another example, the expected heading may be received from a navigational software, such as, any Electronic Navigation Charts or other like cellular applications on smartphones, tablets which can be synchronized to the system.

In step 340, a safety zone ahead of the marine vessel may be calculated based on the position, the heading direction and the speed of the marine vessel. For example, computing device 110 may calculate the size and margins of safety zone 15 based on the position of marine vessel 10 and the SOG and COG. In some embodiments, the margin of safety zone 15 ahead of marine vessel 10 may be calculated from an expected time for running aground of the marine vessel.

In some embodiments, the expected time for running aground of the marine vessel may include the time it may take to stop the cruising of marine vessel 10 in the heading direction (e.g., COG) from its current cruising speed (e.g., SOG). Accordingly, calculating the expected running aground time may include calculating the required vessel's deceleration from its cruising speed to zero. In some embodiments, the calculation may include calculating the vessel's deceleration from a current cruising speed to an engaged speed (also known in the art as "dead slow ahead" speed). As used herein, the engaged speed is the speed in which the engine can engage or disengage with the purpling unit. In some embodiments, the calculation may further include calculating the vessel's deceleration from the engaged speed until a zero speed in the cruising direction. An example, for such calculation is given herein below.

The vessel's declaration a may be define by equation 1:

$$a = \frac{-F_{drag}}{M} \left[\frac{m}{s^2}\right] \quad (1)$$

wherein $F_{drag}$ is the drag force and M is the vessel's mass. The drag force $F_{drag}$ may calculated from equation 2:

$$F_{drag} = \frac{1}{2} \cdot C_D \cdot \rho \cdot V^2 \cdot A [N] \quad (2)$$

wherein: CD is the drag coefficient of the marine vessel, $\rho$ is the water density, V is the vessel's speed (SOG at the COG) and A the cross-section area of the marine vessel under the water line. Therefore, the vessel's declaration a may be calculated from equation 3:

$$a = \frac{-C_D \cdot \rho \cdot V^2 \cdot A}{2M} \left[\frac{m}{s^2}\right] \quad (3)$$

Figure 4:
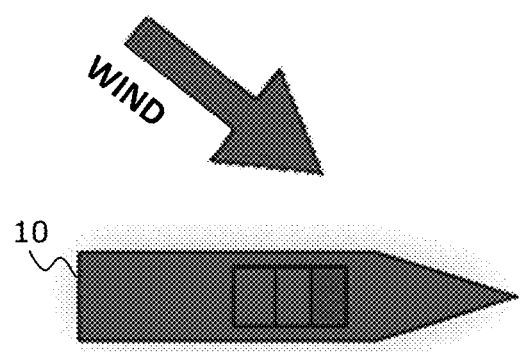
FIG. 4 is an illustration of the impact of wind on a marine vessel according to some embodiments of the invention.

In some embodiments, meteorological data may further affect the declaration and thus the size of the safety zone. The meteorological data may include at least one of: wind velocity, wind direction, high and low tides and current. Accordingly, a wind factor $K_{wind}$ and/or a current factor $K_{current}$ may be added to the declaration calculation. For example, a strong head wind may decrease the required deceleration, and a strong running wind may increase the required deceleration, as illustrated in FIG. 4 at which the projection of the wind vector in the heading direction may increase the required deceleration for stopping marine vessel 10. In some embodiments, the wind factor $K_{wind}$ may be calibrated to be between 0.5-1.5, according to the expected winds. In some embodiments, currents may have similar effect. Accordingly, the current factor $K_{current}$ may be calibrated to be between 0.5-1.5.

In some embodiments, the meteorological data, such as wind velocity, wind direction, high and low tides and current and the like, either may be received from a database or may be received from sensors, such as, a flowmeter, wind sensors and the like attached to marine vessel 10.

Figure 5:
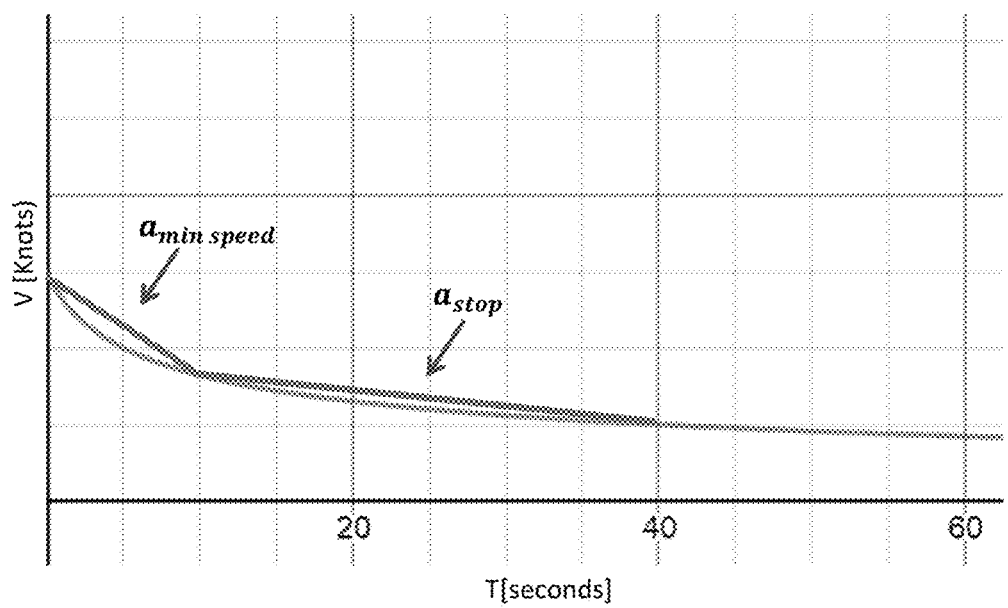
FIG. 5 is a graph showing measured and calculated deceleration of a marine vessel according to some embodiments of the invention.

In some embodiments, two decelerations at the cruising direction (e.g., COG) may be calculated. A first deceleration $a_{engaged}$ speed is the deceleration from a current cruising speed (e.g., the SOG) to the engaged speed, and a second deceleration $a_{stop}$ is the deceleration from the engaged speed to zero. A graph presenting an example for calculating the distance the marine vessel travels (in knots) during the two decelerations is given in FIG. 5. As can be seen, in the first ten seconds, a larger deceleration is obtained in order to reduce the speed of the marine vessel from cruising speed to engaged speed than the deceleration from engaged speed to zero. Accordingly, the time for an expected running aground according to FIG. 5 is three minutes. Therefore, the calculated safety zone is YYY miles. The safety zone margin in the heading direction may be calculated using any known kinematic equations, when, starting position, the acceleration and the initial velocity (e.g., SOG) are known in the heading direction (e.g., COG). In some embodiments, the safety zone margin in the heading direction may be dynamically updated with real time, position, SOG and COG as marine vessel 10 is cruising. The ways to achieve such a deceleration are given in step 360 herein below.

In some embodiments, an alert time may be added as a safety factor to the running aground time. For example, additional 30 seconds may be added for calculating an extended safety zone. For example, the time to reduce from cruising speed to the engaged speed may be 120 seconds, the time to reduce from the engaged speed to zero may be 60 seconds, and the alert time may be 30 seconds. Therefore, the new expected running aground time may be 3.5 minutes.

In step 350, a location of a critical seabed depth in the safety zone may be identified, for example, based on the received geographical data.

In some embodiments, an effective seabed depths $D_{eff}$ may be calculated, for example, by computing device 110. The effective seabed depths $D_{eff}$ may be defined as the marine vessel draft and a bottom safety margins $X_m$. An example for calculating the effective seabed depths $D_{eff}$ is given in equation 4.

$$D_{eff} = \text{vessel draft} + X_m [m] \quad (4)$$

where $X_m$—is a safety margin that may be define in system 100 set-up, default value, for example, 2 m, 3 m, 4 m and more. In some embodiments, $X_m$ may be dependent on the size and type of the marine vessel, the larger the marine vessel the larger is the selected $X_m$.

In some embodiments, if the effective seabed depths $D_{eff}$ is lower than the seabed depths at at least one location inside the safety zone (e.g., safety zone 15) than a critical seabed depth may be identified.

In some embodiments, in order to increase the accuracy of the identification of the critical seabed depth, computer processing device 110 may receive additional data, for example, from one or more sensors 30A and 30B. In some embodiments, a more accurate determination of the distance of marine vessel 10 from the seabed may be determined by using a depth gauge to measure the actual sea depth. In some embodiments, real time measurement of an actual seabed depth at the position of the marine vessel may be received from a depth sensor (e.g., sensors 30A and 30B) associated with the marine vessel. In some embodiments, the actual seabed depth may be compared with a seabed depth at the position of the marine vessel received from the geographical data. For example, a correction factor may be calculated based on the comparison. In some embodiments, the seabed depths included in the received geographical data may be corrected based on the comparison, for example, by multiplying by the correction factor.

In some embodiments, processing unit 110 may run a calibration process to calibrate the off-set of the depth gauge, thereby, eliminating the need to calculate the draft of marine vessel 10 in the sea. For example, at a known location having a known depth (e.g., in the harbor), one or more depth gauges may take measurements of the depth of the seabed to be compared to the known seabed depth. The one or more depth gauges may be located for example, at the prow of the ship (bow of the boat) and/or at the stern.

In some embodiments, an expected seabed depth at the position of marine vessel may be calculated in real-time based on the geographical data and the time and date, taking for example, the high/low tides into account. In some embodiments, the average seabed depth received from ENC/

GIS may be corrected according to the expected high/low tides at the position of marine vessel at the specific time and date.

In step 360, a state of a propelling unit of the marine vessel may be changed when a critical seabed depth was identified inside the safety zone. In some embodiments, computing device 110 may control the propelling unit to reduce the speed of the marine vessel, for example, from cruising speed to engaged speed. In some embodiments, computing device 110 may control the propelling unit to disengage the engine of the marine vessel from the propelling unit, for example, when at the engaged speed. In some embodiments, computing device 110 may control the propelling unit to activate dynamic positioning system (DPS) which may allow to keep marine vessel 10 substantially at its current position. In some embodiments, computing device 110 may control the propelling unit to maneuver the marine vessel towards a wind direction, while providing a required thrust in order to keep the vessel in its position without drifting down the wind. Such a maneuver may allow to reduce the speed and stop the marine vessel even for a sailing-boat (e.g., a ketch, a xebec and the like).

In some embodiments, computer processing device 110 may change the course of the marine vessel in order to avoid collision. For example, computer processing device 110 may stir stirring system of the propulsion unit, thus causing marine vessel 10 to turn away from, for example, coastline 50 or obstacle 60.

In some embodiments, additionally or alternatively to step 360, computing device 110 may be configured to send an alert to a user device, by the controller, when a critical seabed depth was identified inside the safety zone. The user device may be an external user device (e.g., a user's mobile phone, laptop computer, smart watch and the like). In some embodiments, computing device 110 may be configured to send an alert to user interface 130. The alert may be an audio sound, a vibration, a visual alert or a combination thereof.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of controlling a marine vessel, comprising:
receiving, by a controller, a position of the marine vessel from a positioning system;
receiving, by the controller, geographical data, from at least one database, the geographical data comprising at least a map of obstacles;
receiving, by the controller, a heading direction and speed of the marine vessel;
calculating an expected time for running aground of the marine vessel, by calculating two decelerations, a first deceleration from a current cruising speed to a disengagement speed and a second deceleration from the disengagement speed to zero speed, wherein the disengagement speed is the speed at which an engine of the marine vessel can engage or disengage with a propelling unit of the marine vessel;
determining, by the controller, a safety zone ahead of the marine vessel based on the expected time for running aground, the position, the heading direction and the cruising speed of the marine vessel;
identifying, by the controller, a location of an obstacle inside the safety zone based on the received geographical data; and
changing, by the controller, a state of the propelling unit of the marine vessel when a critical obstacle was identified inside the safety zone, wherein changing the state of the propelling unit of the marine vessel comprises disengaging the engine of the marine vessel from the propelling unit.

2. The method of claim 1, wherein determining the safety zone comprises dynamically updating margin distances of the safety zone during the marine vessel cruise.

3. The method of claim 1, wherein identifying a location of an obstacle a critical seabed depth inside the safety zone comprises:
calculating an effective obstacle proximity based on the vessel's draft and a predetermined obstacle proximity.

4. The method of claim 1, further comprising:
receiving real time measurement of an actual obstacle at the position of the marine vessel from a depth sensor associated with the marine vessel;
comparing the actual obstacle with an obstacle at the position of the marine vessel from the received geographical data; and
correcting the obstacles included in the received geographical data based on the comparison.

5. The method of claim 1, further comprising: receiving marine vessel properties; and calculating the safety zone also based on the marine vessel properties.

6. The method of claim 1, wherein the marine vessel properties comprise at least one of: the type of the marine vessel, the weight of the cargo carried by the marine vessel, the distribution of the cargo on the marine vessel and dimensions of the marine vessel.

7. The method of claim 1, further comprising: receiving meteorological data in an area at which the marine vessel is sailing; and determining the safety zone also based on the meteorological data.

8. The method of claim 7, wherein the meteorological data comprises at least one of: wind velocity, wind direction, high and low tides and current.

9. The method of claim 8, wherein the meteorological data is received from at least one of: a database and at least one sensor associated with the marine vessel.

10. A system for controlling a marine vessel, comprising:
a memory for storing instructions; and
a controller configured to:
receive a position of the marine vessel from a positioning system;
receive geographical data, from at least one database, the geographical data comprises at least a map of obstacles;
receive a heading direction and speed of the marine vessel;
calculating an expected time for running aground of the marine vessel, by calculating two decelerations, a first deceleration from a current cruising speed to a disengagement speed and a second deceleration from the disengagement speed to zero speed, wherein the disengagement speed is the speed at which an engine of the marine vessel can engage or disengage with a propelling unit of the marine vessel;
determine a safety zone ahead of the marine vessel based on the expected time for running aground, the position, the heading direction and the speed of the marine vessel;

identify a location of a critical obstacle seabed depth inside the safety zone based the received geographical data;
change a state of the propelling unit of the marine vessel when a critical obstacles was identified inside the safety zone; and
disengage the engine of the marine vessel from the propelling unit.

* * * * *